United States Patent

[11] 3,571,830

[72] Inventor Justin J. Wetzler
  Evanston, Ill.
[21] Appl. No. 826,138
[22] Filed May 20, 1969
[45] Patented Mar. 23, 1971
[73] Assignee F. W. Means & Co.
  Chicago, Ill.

[54] LIQUID PROCESSING OF DISCRETE ARTICLES WITHOUT JOINING SAME
14 Claims, 8 Drawing Figs.

[52] U.S. Cl. .................................................. 8/150,
  68/19, 68/19.1, 68/43, 68/99, 68/158
[51] Int. Cl. ........................................... D96f 35/00
[50] Field of Search ....................................... 8/150;
  68/19, 19.1, 43, 99, 158

[56] References Cited
UNITED STATES PATENTS
3,465,549  9/1969  Wendt ........................  68/19

*Primary Examiner*—Marion Parsons, Jr
*Attorneys*—Keith J. Kulie and Donald B. Southard ABSTRACT: A process and apparatus for liquid processing of a bundle of discrete articles where the articles first are placed in a defined bundle; the bundle then being placed in a liquid bath and moved with respect to the bath while pressure is alternatively applied and released to cause liquid to move into contact with all articles of the bundle and to flow through the bundle as a result of the pumping action; withdrawing the bundle from the bath and passing the articles through a rinse section to flush out soil and then through a dryer to remove moisture and return the articles to a substantially dry condition and ironing the articles to finished form.

PATENTED MAR 23 1971 3,571,830
SHEET 1 OF 3
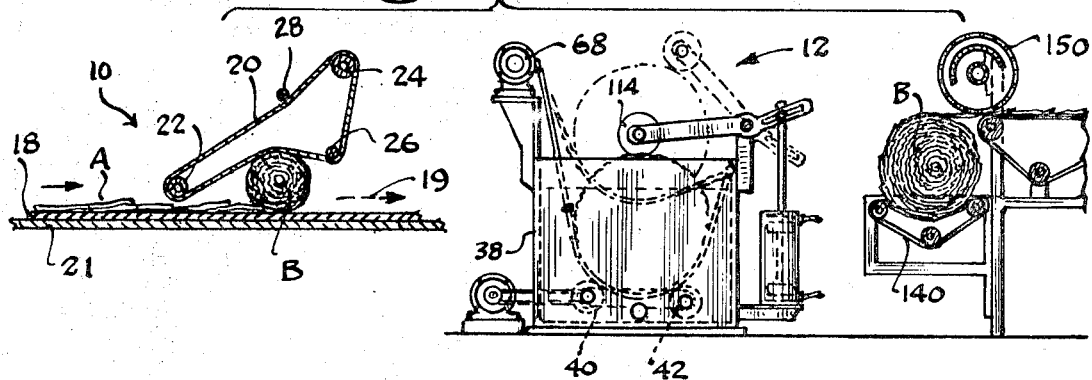
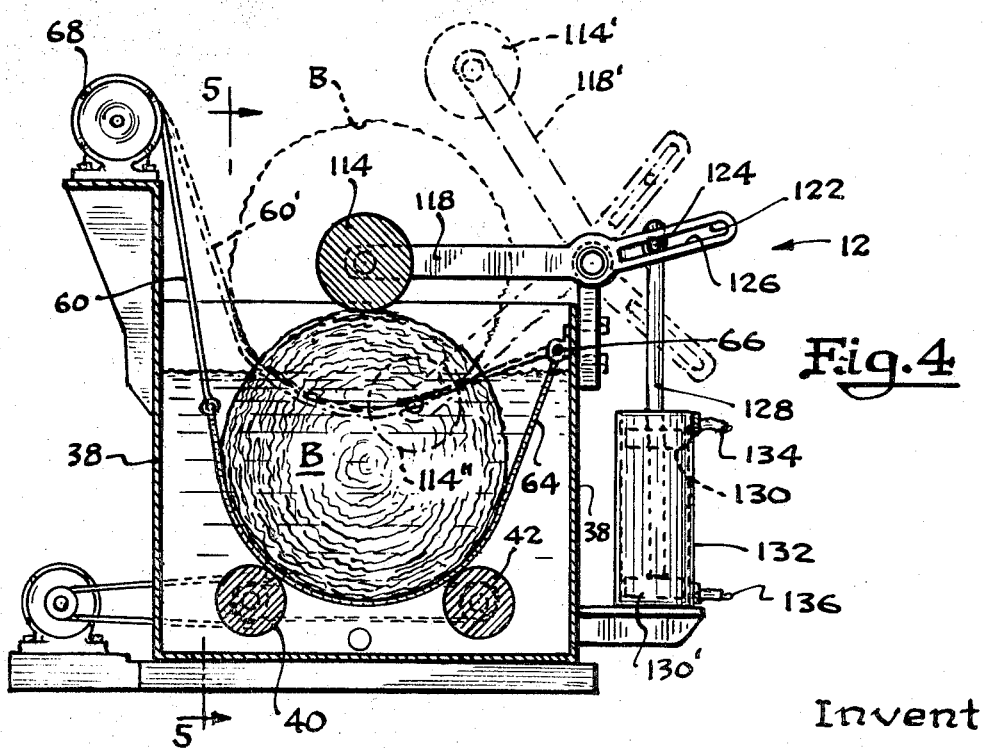
Inventor
Justin J. Wetzler
By Keith J. Kulie and Donald B. Southard
Attorneys Inventor
Justin J. Wetzler
By Keith J. Kulie and Donald B. Southard
Attorneys

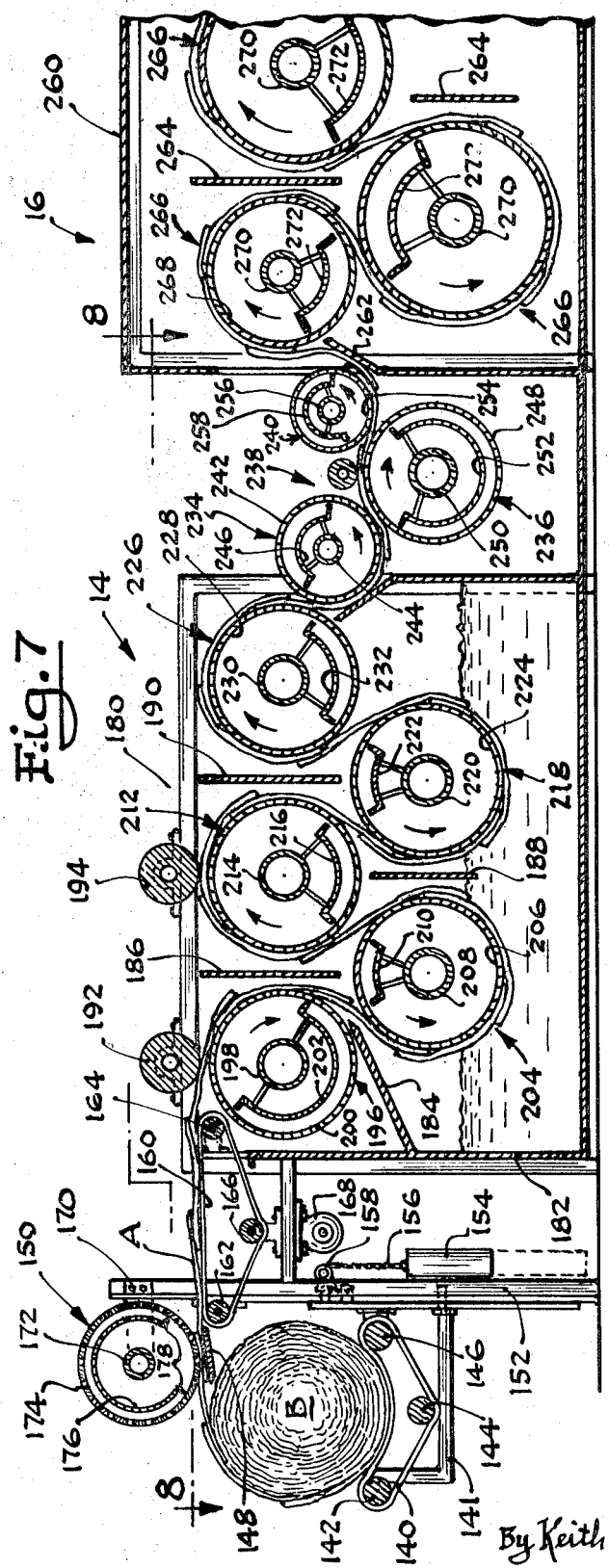
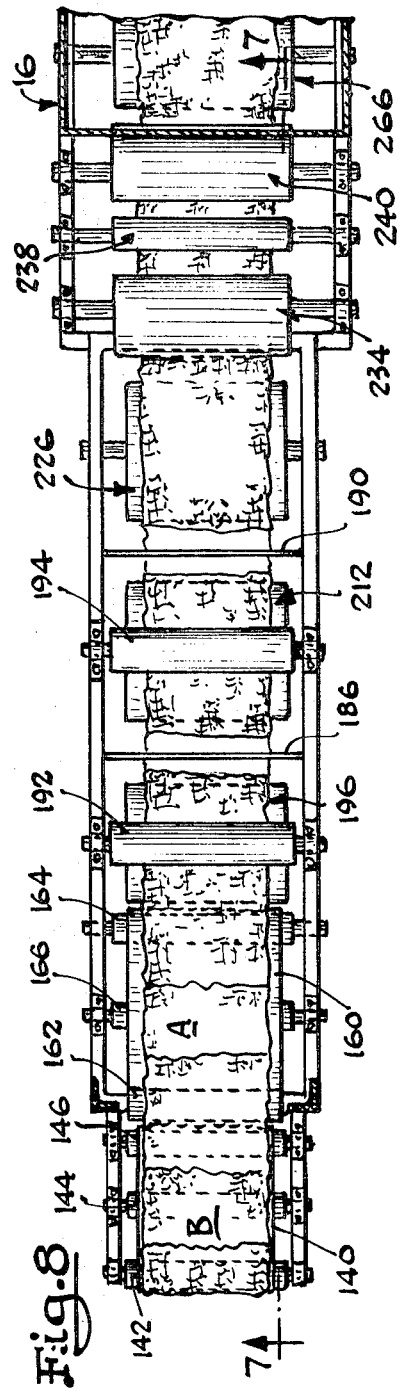

LIQUID PROCESSING OF DISCRETE ARTICLES WITHOUT JOINING SAME

The present invention relates to a process and apparatus for liquid processing of discrete articles without physically joining the articles for processing in a substantially continuous manner.

The apparatus and process are particularly adapted for conditioning relatively short length articles on a substantially continuous basis without physically joining the articles at any stage during the process.

Many devices have been developed from time-to-time for laundering or otherwise conditioning articles in a form which permits continuous or substantially continuous processing. Some of these devices require physical joining of the individual articles prior to processing to define a continuous chain of material which may be drawn through the apparatus. Other devices require the placement of articles between two conveyor bands to retain them in proper orientation.

When articles are joined in the manner noted above it is necessary, of course, to separate them at a later stage for reuse in the originally defined form of the article. This involves severing the joined area in a manner which will not result in damage to the article.

Other processes for laundering or otherwise processing articles contemplate "batch" processing solely where the articles may be placed in a receptacle in random form and laundered in the receptacle. The articles then are individually withdrawn from the receptacle and processing is continued by drying and pressing the articles or subjecting them to the desired treatment with the articles being individually handled. Such processing involves a significant amount of handling of the articles which in many instances will require additional labor and expense.

It should also be noted that devices have been developed which are suitable for processing individual articles of any length in a continuous manner. The specific structural configurations of the devices have taken many different forms, each being suitable for the designed purpose of the device. However, suitable means are not commonly available for use in continuous processing of individual articles without physically joining the articles in some manner.

It is the primary purpose of the present invention to provide an apparatus which is useful in conditioning individual articles without joining them thereby avoiding the joining and separating steps.

It is, accordingly, a general object of the present invention to provide an improved apparatus for processing single articles without physically joining the articles.

Other objects and advantages of the present invention reside in the provision of an apparatus for processing individual articles without physically joining them wherein liquid is caused to move into intimate contact with all portions of a bundle of said articles and to flow through the bundle due to pumping action caused by the repetitive application and release of pressure on the bundle; said articles being processed in a substantially continuous manner after conditioning in said liquid bath; the apparatus being economical to fabricate and maintain; the process and apparatus being readily adapted for installation and use with conventional auxiliary supply means commonly available; the apparatus being economical to fabricate and to maintain; durable in use, easy to use and which is adaptable for use with individual articles of many differing sizes.

The novel features which I believe to be characteristic of my invention are set forth with particularity in the appended claims. My invention itself, however, together with further objects and advantages thereof will best be understood by reference to the following description taken in connection with the accompanying drawings, in which:

FIG. 1 is a side elevation of a portion of the winding apparatus illustrating in particular the means for arranging individual articles into a bundle; the liquid processing stage of the total sequence and the take off for further processing of the articles; with the winding apparatus being substantially as shown in my U.S. Pat. No. 3,315,908;

FIG. 2 is a fragmentary top view of one form of apparatus that may be employed for assembling the individual articles into a bundle;

FIG. 3 is a schematic representation of a bundle of individual articles with a belt to secure the articles in bundle form;

FIG. 4 is a side elevation, partly in section, of the receptacle associated with the system and adaptable for use in the process for liquid processing of articles in the process;

FIG. 7 is a side view, partly in section, of the further processing steps for use in conditioning single articles without physically joining the articles, the view further illustrating means for rinsing, drying and ironing the individual articles; and FIG. 8 is a top view of the apparatus schematically illustrated in FIG. 7.

Figure 5:
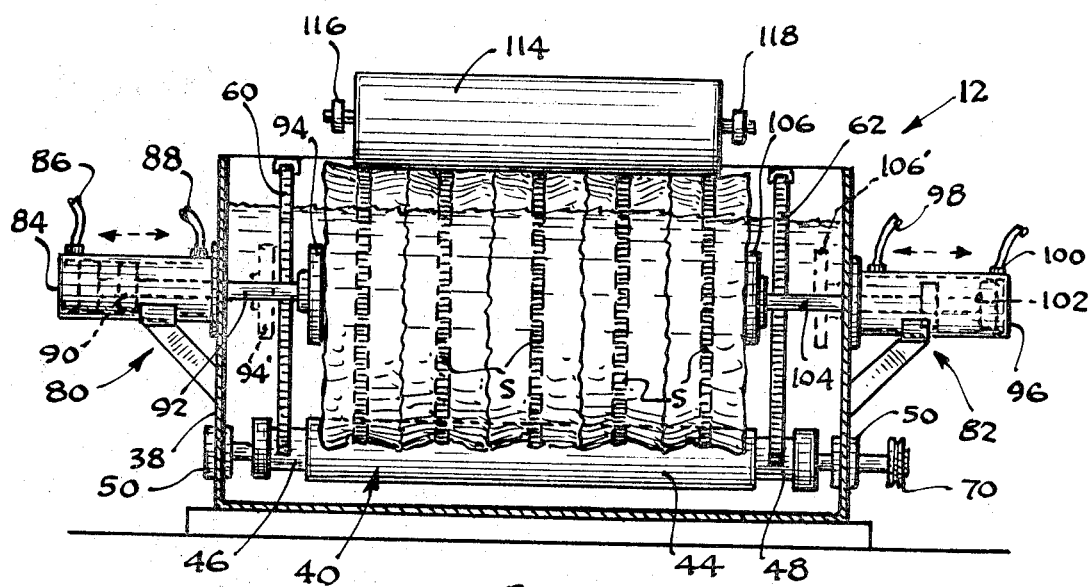
FIG. 5 is a cross section view of the apparatus of FIG. 4 showing a plurality of bundles within the liquid holding receptacle of the apparatus for use in liquid processing and with the retaining grips for the bundles disposed along either side of the group of bundles.

Referring more particularly to the drawings, the processing sequence for liquid conditioning of individual articles is schematically illustrated and includes (1) a belt winding means 10 for rolling the individual articles, unjoined, into a bundle for further processing; (2) liquid processing apparatus, indicated generally at 12, for use in conditioning the articles; (3) rinse means 14 for removing the processing liquid from the articles; and (4) a dryer-ironer for final processing of the articles. It should be observed that the articles may be packaged in some form after drying and ironing by a separate apparatus (not shown) which will assemble the individual articles as desired.

As noted above, the present apparatus is particularly adapted for use in processing single articles along a substantially continuous processing line without physically joining the articles. Articles of the type contemplated above might include table napkins, hand towels, or bed sheets, for example.

Individual articles A are taken from a mixed bundle of articles (not shown) and positioned on a moving conveyor 18 of the belt winding means 10. The conveyor 18 is mounted on a suitable support means 21 and may be driven by an electric motor (not shown) connected to one of the rolls of the conveyor 18 by means of a drive belt, or the like.

A winding means is associated with the means 10. The winding apparatus is defined by a continuous belt 20 moving about rolls 22, 24 and 26. The belt 20 is driven by rotation of one of the rolls.

The roll 26 is mounted for vertical movement along a support to accommodate increasing diameters of a bundle B being processed.

It should be observed that various devices may be utilized for winding the individual articles A. Two such devices are shown in U.S. Pat. Nos. 3,315,908 and 3,314,627 relating to improved winding devices for use in rolling soft articles with a roll.

The device shown in FIG. 1 is the form of U.S. Pat. No. 3,315,908. The articles A move along the conveyor 18 under the belt 20. The belt 20 moves over fixed rollers 22 and 24 and moveable roller 26. Roll 28 keeps tension on the belt 20. Belt 18 moves in direction of the arrow 19 and belt 20 is moved in the opposite direction. The articles A are folded over between the belts and successively rolled upon each other to define the bundle B. When the desired bundle dimension is reached the bundle B is withdrawn from the winding means.

It should be observed that the single articles A are wound in overlapping relation with a wrapper being disposed about the outer periphery of the bundle B to hold the free ends of the outermost articles in wrapped configuration and to hold the bundle in its defined form.

The bundle B is transferred to the liquid processing apparatus 12 where it is immersed in a liquid bath for the desired conditioning. The articles A of the bundle may be subjected to a detergent washing, for example, and the discussion of the apparatus here will be set forth as a process for laundering articles. It should be noted, however, that other liquid processing may also be realized without changing the apparatus or sequence of operations.

Figure 6:
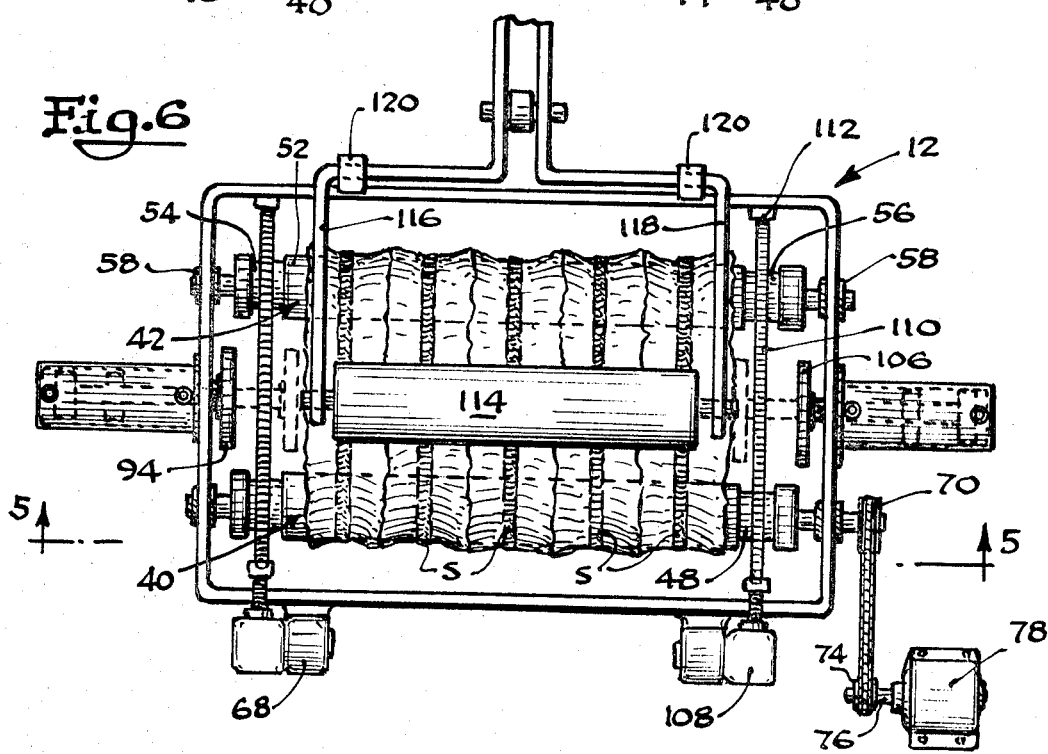
FIG. 6 is a top view of the apparatus shown in FIGS. 4 and 5 illustrating the squeeze roller which rests upon the top of the group of bundles, the roller being employed to exert a pressure upon the bundles during processing as one step in the pumping operation to assure liquid contact with the articles in the bundle.

The liquid processing apparatus 12 is shown in greater detail in FIGS. 4, 5 and 6. The apparatus 12 is defined by a liquid receptacle 38 within which bundle drive rolls 40 and 42 are disposed. The roll 40 is characterized by a solid central section 44 extending to recessed portions 46 and 48 at either end thereof. The roll 40 is rotatably supported in the wall of receptacle 38 by bearing members 50 with a suitable seal thereabout to prevent discharge of liquid about the bearing mounts.

The roll 42 likewise is characterized by a solid central section 52 extending to recessed portions 54 and 56 at either end thereof. The roll 42 is rotatably supported in the wall of the receptacle 38 by bearing members 58 with a suitable seal thereabout to prevent discharge of liquid about the bearing mounts.

It should be observed that either or both of the rolls 40 and 42 may be driven to carry out the processing concept set forth herein. The rolls 40 and 42 preferably are fluted to provide for better gripping action between the rolls and the array of bundles in the receptacle 38.

The liquid processing apparatus 12 is provided with bundle loading and unloading bands 60 and 62, respectively, to place the bundles into the receptacle and to remove them from the receptacle. As shown in FIG. 4, one end 64 of the band 60 is secured to one wall of the receptacle 38 by the pivot means 66. The band 60 extends from the fixed end 64 to a winch 68. The winch 68 is provided to shorten or lengthen the effective band length between the winch and the end 64. As the band is drawn onto the drum of the winch 68 it can readily be seen that the effective band length is shortened and the band is pulled upwardly within the receptacle.

When the winch 68 has fully withdrawn the band 60 the band will be elevated substantially above the bottom of the receptacle 38. For example, the band 60 may be disposed at about the position shown at 60′ in FIG. 4. The bundle B is transferred from the winding means 10 to the liquid processing apparatus 12 by first depositing the bundle on the "withdrawn" band 60′ with the bundle B in position as shown by the dashed lines of FIG. 4.

The bundle is lowered into the liquid receptacle 38 for immersion in the liquid bath by discharge of the band 60 from the winch 68. This action extends the effective length of the band 60 between the end 64 and the winch 68. The weight of the bundle B moves the band down to move the bundle into the liquid.

As the bundle input band 60 is lowered to immerse the bundle B within the liquid in the receptacle 38, the band 60 is received within the recesses 46 and 54 of the rolls 40 and 42, respectively. With the band 60 in said recesses the bundle B will rest upon the general roll surface and it will be free of the band 60 for lateral movement along the surface of the rolls 40 and 42.

The roll 42, as illustrated herein in FIG. 6, is an idler roll and will rotate in accordance with movement of the bundle B. The roll 40 is driven and may be provided with a pulley 70 adapted to receive a drive belt 72 thereon. The belt 72 also extends about pulley 74 which is nonrotatably secured to the shaft 76 of drive motor 78. When the motor 78 is energized the roll 40 will be driven. It should be observed that speed reducing means (not shown) may be provided to change the output r.p.m. of the motor 78 to any level desired for use in driving the roll 40.

Retaining means 80 and 82 are provided in association with the apparatus 12 to keep the bundles B properly laterally positioned within the receptacle 38 for processing in the liquid bath.

The retaining means 80 is defined by a fluid cylinder 84 with ports 86 and 88 to permit fluid flow to and from the cylinder 84. A piston 90 is operatively disposed within the cylinder 84 with the shaft 92 thereof extending from one end. A bundle engaging plate 94 is rotatably supported by the free end of the shaft 92.

The retaining means 82 is defined by a fluid cylinder 96 having ports 98 and 100 to permit fluid flow to and from the cylinder 96 to control operation of the retaining means 82. A piston 102 is operatively disposed within the cylinder 96 with the shaft 104 thereof extending from one end of the cylinder. A bundle engaging plate 106 is rotatably supported by the free end of the shaft 104.

The plates 94 and 106, which are moved against the sides of the end bundles by operation of the retaining means 80 and 82, respectively, are adapted to rotate freely with rotation of the bundles during processing of the articles. When a bundle is to be inserted or removed from the receptacle 38 the plate 94 or 106 of the means 80 or 82, respectively, will be moved to a withdrawn position as shown at 94′ or 106′. The retaining means 80 and 82 hold the plurality of bundles B within the receptacle 38 in the desired vertical, aligned relation and provide means to prevent disorientation or spilling of the articles and bundles during liquid processing.

As noted hereinabove, a bundle charging device is operatively associated with the liquid processing apparatus 12. The device is defined by the winch 68 in combination with the band 60 which is moved toward position 60′ or its relaxed position by the winch 68. A similar device is provided at the opposite end of the receptacle 38 of apparatus 12 to remove processed bundles from the receptacle 38. This device is defined by a winch 108 associated with the band 110. One end of the band 110 is pivotally secured to a fastener 112 on one wall of the receptacle 38 and extends from the fastener 112 continuously to the winch 108. As the band 110 is drawn on to the winch 108 the effective length of the band between the winch 108 and the fastener 112 will be shortened and the band will rise with respect to the receptacle 38. When the band 110 is released from the winch it will be lowered in the receptacle 38. It can readily be seen that a bundle B can be lifted out of the receptacle by drawing the band onto the winch to lift the bundle to an elevated position where it can conveniently be reached for removal from the receptacle.

When the band 110 is fully extended it will rest within the recesses 48 and 56 of the rolls 40 and 42, respectively. It can readily be seen that with the band in the recesses a bundle B may be moved over the band 110 without catching on the band. In this way the band is placed beneath the bundle B for ease in removal of the bundle.

The bundle B is moved along the rolls 40 and 42 and over the band 110 by the means 80. The plate 94 of the means 80 pushes against the array of bundles in the receptacle 38 by extension of the piston 90 from the cylinder 84. The plate 106, of course, is withdrawn in unison with movement of the plate 94 to permit the end bundle to move over the band 110.

A heavy roller 114 is rotatably mounted on arms 116 and 118 of the apparatus. The arms 116 and 118 are supported in brackets 120 secured to the apparatus.

As shown in FIG. 6 of the drawings, the arms 116 and 118 are formed so that they extend toward each other through the brackets 120 and then extend through another formed bend to bring the outboard portions of the arms 116 and 118 to closely spaced relation.

A slot 122 is defined in the arms 116 and 118 along the closely spaced outboard portions (FIG. 4) thereof. A pin 124 rides in the slots 122 and is mounted within a mating opening in the free terminal 126 of the piston rod 128.

The rod 128 is operatively connected to the piston 130 of the cylinder 132. Ports 134 and 136 are provided in the cylinder 132 to permit fluid flow within the cylinder to control movement of the piston within the cylinder.

The piston 130 is operatively associated with the cylinder 132 to move between the position schematically illustrated at 130 and the opposed position alternately illustrated at 130'. As the piston is moved within the cylinder 132 and the shaft 128 will move along with it. The pin 124 will define a cam member which will move along the cam track defined by the slots 122 of the arms 116 and 118. When the piston is extended, as in the solid lines of FIG. 4, the arms 116 and 118 will be moved to a position to bring the heavy roll 114 into contact with the array of bundles within the receptacle 38. The roll 114 may be moved further into the receptacle by continued extension of the piston 130 to the position shown at 114", for example.

Retraction of the piston to the position illustrated at 130' will elevate the roll 114 to the position schematically illustrated at 114'. The pin 124 will move along the slots 122 to cause the arms 116 and 118 to pivot about the brackets 120. Elevation of the roll 114 will open the top of the receptacle 38 to permit the bundles to be moved along the rolls 40 and 42 for insertion and removal of bundles from the receptacle.

When the liquid processing apparatus is operative the cylinder (132)—piston (130) assembly will be neutralized to permit the roll 114 to rest upon the top of the bundles B to define a pressure squeezing action upon the bundles causing liquid to be expelled from the bundles as each portion thereof passes beneath the roll 114.

A similar squeezing action to expel liquid from the bundle B is realized when the bundles pass over the rolls 40 and 42 of the apparatus 12. It can readily be seen that the combined weight of the wet articles defining each of the bundles B will cause the bundles to be relatively heavy. The bundles rest upon the rolls 40 and 42 and will deform as they pass over the rolls 40 and 42 in naturally adapting themselves to the shape of the roller. The deformation of the bundles will cause the articles of the bundle to move closer together. The liquid between and within the articles of the bundles will be displaced laterally to flow along and out of the bundles. Accordingly, a cycling pumping action is achieved within the bundles with liquid continually moving within the bundle.

The weighted roll 114 pushes the bundles down onto the rolls 40 and 42 to increase the squeeze action and to increase the frictional engagement of the bundles with the rolls 40 and 42 to enhance the driving action of said rolls. When liquid is displaced and moved out of the bundles it will surge back into the bundles after they are removed from contact with the rolls. It should be noted that this pumping action also will assist in dislocating soil in a washing operation as soon as detergents have loosened the soil enough to float it our of the article.

In another form of wash operation, with the method and apparatus set forth herein, the bundles B could be held stationary in the receptacle and the pumping action achieved by alternating squeezing paddles applying pressure to the bundles from various directions. The object, of course, is to obtain a fluid surge or flow through the bundle while keeping the bundles immersed in the liquid.

When the liquid processing stage of the method is completed the bundles are sequentially removed from the receptacle 38 and placed upon a belt 140. The belt 140 is supported upon the rolls 142, 144 and 146. One of the rolls 142, 144 or 146 may be driven to control movement of the belt 140.

The strap S which is wrapped about the bundle B is removed so that the individual articles A may be removed from the bundle for subsequent processing in the apparatus disclosed herein. As noted above, the articles are wrapped in overlapped relation in the bundle B.

The first article of the bundle may be positioned on a takeoff table 148. A suction roll 150 is operatively mounted above the table 150 and is adapted to selectively remove each successive article A from the bundle B, deposit on the table 148 and release it on the table.

The belt 140 and associated roll means 142, 144 and 146 are mounted on a support frame 141 which, in turn, is moveably supported on a vertical support member 152. The frame 141 may be mounted for movement along a track on the support member 152. The frame 141 may be vertically oriented by means of a counterweight 154 which is connected to the frame 141 by a cord 156 which extends over the pulley 158. The counterweight 154 and associated means are arranged so that the weight of the bundle B will be sufficient to lower the bundle to a position against action of the counterweight where the upper periphery of the bundle will be in substantially the same plane as the upper surface of the takeoff table 148. It can readily be seen that as articles are removed from the bundle it will become lighter and will be elevated by action of the constant weight of the counterweight 154. Control of this action may be further regulated by the use of springs, or the like, which have variable rates depending upon the amount of extension or tension of the spring member.

A feed belt 160 is supported on the rolls 162, 164 and 166. In the specific form of the apparatus illustrated in the drawings (FIG. 7) the roll 166 is drivingly connected to the motor 168 to direct movement of the belt 160 as desired.

It should be noted that the drive motor 168 may also be connected to the roll 146, for example, to drive the belt 140 in a one-to-one relation with the belt 160.

The suction roll 150 is rotatably supported on the support 170 by the hollow shaft 172. The roll 150 is defined by an outer shell 174 having perforations therein extending about the entire circumference of the shell. A mask 176 is supported by the shaft 172 and is in close-spaced proximity to the outer shell 174 to "block" the openings of the shell as noted hereinbelow. It can be seen from the illustration of FIG. 7 that the mask 176 extends substantially about the inner periphery of the shell 174 except for the relatively small circumferential distance between the mask ends as shown at 178 in FIG. 7.

When the bundle of articles is placed on the belt 140 it will be positioned such that the upper periphery of the bundle will be adjacent the lower periphery of the suction roll 150. The hollow shaft 172 of the suction roll 150 is connected to an evacuating source. Air is continually withdrawn from the shaft 172. The shaft is in evacuating communication with the interior of the roll 150 so that air is drawn from the interior into the shaft to the evacuating source. It can readily be seen from the illustration of FIG. 7 that the air primarily is drawn through those openings into the outer shell 174 which extend into the unmasked area 178 of the roll 150. This area is oriented such that it is at the lower peripheral portion of the roll 150 and adjacent the takeoff table 148.

The first article of the bundle B is positioned on the takeoff table 148 by action of the roll 150. As noted above, air is drawn through the openings in the shell 174 in the area 178. This creates a suction or low pressure area adjacent the takeoff table 148 and lifts the outer most article onto the table and carries it along by continued rotation of the roll 150 in a counterclockwise direction as shown in FIG. 7. When the article extends substantially to the belt 160 it enters the masked area of the roll and the suction holding the article to the roll is terminated. Accordingly, the article drops off the roll 150 and onto the belt 160 where it is carried along by rotation of the belt. A series of suction rolls having partially masked areas is provided in the rinse apparatus 180.

The rinse apparatus 180 is defined by a receptacle 182 adapted to hold rinse fluid or any other desired material necessary for the processing sequence. The receptacle 182 is divided into separate area by partitions 184, 186 188 and 190.

Spray rolls 192 and 194 are mounted on the receptacle 182 over the chambers between partitions 184—186 and 186——190, respectively. The spray rolls are adapted to discharge fluid therefrom in a stream, as desired during use of the apparatus.

A first roll 196 is mounted in the area of the receptacle between the partitions 184 and 186. The roll 196 is rotatably mounted on a hollow shaft 198. The roll 196 is defined by a perforated outer shell 200. A mask 202 extends about a portion of the inner periphery of the outer shell 200 to isolate the openings in the shell 200 which are adjacent the mask from time-to-time.

The shaft 198 of the roll 196 is connected to a vacuum source. As noted in discussion of the operation of roll 150 above, air is continually withdrawn through the hollow shaft 198 of the roll 196. The air is drawn into the shaft 198 from the interior of the drum 196 and of course, is pulled through the openings of the unmasked portions of the shell 200. It can be seen from the illustration of FIG. 7 that the unmasked portions of the roll 200 extend from the belt 160 to an area approximately vertically tangent with the roll 196.

A second roll 204 is rotatably mounted in the receptacle 182 between the partitions 184 and 188 in said receptacle. The roll 204 is defined by a perforated outer shell 206 rotatably mounted on the hollow shaft 208. A mask 210 is supported from the shaft 208 and extends in close proximity to the inner surface of the shell 206 spanning the lower terminal of the partition 186. As noted above, the mask 210 blocks the movement of air through the shell in the masked area to permit the fabric to drop off or to be drawn off of the shell.

A third roll 212 is rotatably mounted on the hollow shaft 214 in the receptacle 182 in the area defined between the partitions 186 and 190 and above the partition 188. The spray roll 194 is rotatably mounted above the roll 212 and is adapted to dispense fluid on fabric passing over the roll 212. As shown in FIG. 7, the rolls 196 and 212 are positioned in the top portion of the receptacle 182 such that at least the uppermost portions thereof are above the level of liquid within the receptacle 182. A mask 216 is nonrotatably mounted on the shaft 214 and extends along an area above the partition 188 and several degrees to either side thereof, for reasons noted hereinbelow in description of the operation of the apparatus illustrated in the drawings.

A successive roll 218 is rotatably mounted within the receptacle 182 between the partition 188 and the right end wall of the chamber 182 as illustrated in FIG. 7. The roll 218 is mounted below the partition 190 and is rotatably supported on the hollow shaft 220. A mask 222 is nonrotatably supported by the shaft 220 and extends below the partition 190 and several degrees on either side thereof. The roll 218 is further defined by a perforated shell 224 supported by the shaft 220. The shaft 220 is connected to a vacuum or low pressure source. In operation, as with the other rolls noted above, air moves through the perforations of the outer shell, to the roll interior, into the hollow shaft and to the vacuum source.

Another roll 226 is mounted in the receptacle 182 between the partition 190 and right end wall of the receptacle 182 as shown in FIG. 7. The roll 226 is defined by an outer shell 228 rotatably supported by the hollow shaft 230. A mask 232 is nonrotatably supported by the shaft 230 and extends along the lower portion of the roll 226 through an arc of about 90°, or sufficient to provide the action noted hereinbelow.

Transfer means is provided to carry articles from the rinse mechanism 14 to the drier-ironer 16. The transfer means illustrated in FIG. 7 includes a plurality of rolls 234, 236, 238 and 240, all supported for rotation from a suitable frame or support (not shown).

Roll 234 is defined by a perforated outer shell 242 rotatably supported on a hollow shaft 244 which, in turn, is connected to a vacuum source (not shown). A mask 246 is nonrotatably secured to the shaft 244 and extends about substantially the upper shaft of the roll 234 in close spaced relation to the inner face of the shell 242 to block the flow of air through the drum perforations in the mask area.

Roll 236 is mounted below and to the right of roll 234 (FIG. 7) and is defined by a perforated outer shell 248 rotatably mounted of the hollow shaft 250. A mask 252 is nonrotatably supported by the shaft 250 and is in close-spaced proximity to the inner face of the shell 248 to block movement of air in the masked portion.

Roll 238 is mounted above roll 236 and in relatively closely spaced relation thereto so that it will lightly engage material moving over the top of the roll 238.

Roll 240 is mounted above and to the right of roll 236 (FIG. 7) with the lower periphery thereof substantially aligned with a tangent extending along the upper periphery of roll 236. Roll 240 is defined by a perforated outer shell 254 rotatably supported on a hollow shaft 256 and having a mask 258 in close-spaced proximity to the inner surface of the shell 254.

The drier 16 is enclosed by a cabinet 260 into which heated air is introduced. The cabinet 260 is provided with an opening 262 on one end thereof to receive articles to be dried within the cabinet. The drier may be divided into a series of compartments by partitions such as shown at 264 within the cabinet 260. A series of rolls 266 are rotatably mounted within the cabinet 260 to receive articles during operation of the apparatus. The rolls 266 each are provided with a perforated outer shell 268 rotatably mounted on a shaft 270 which, in turn, is supported by the cabinet 260. The shafts 270 are hollow and intended to permit the passage of air therealong. Each of the rolls 266 are further provided with a mask 272 which is nonrotatably supported on the shaft 270 and extends in close-shaped proximity to the inner surface of the outer shell 268. The masks 272 are intended to block the passage of air through the perforated outer shell in the masked area.

The process will be described and the use of the apparatus set forth herein will be characterized in conjunction with the processing of single articles in a substantially continuous processing line without the attendant need for physically joining the articles for processing. Articles of the type suggested here may be table napkins, hand towels, or other similar articles.

As noted hereinabove, the individual articles are taken from a storage container in which they are randomly, loosely deposited. The articles A are placed on a conveyor 18 (FIG. 1) and moved along to a bundling station. It should be noted that the articles may be removed from the storage container (not shown) manually or with any of the automatic devices known in the art.

The articles are moved along the conveyor to the winding means 26. It can readily be seen that they are formed into a bundle B at the winding station 26, which bundle may be of any diameter desired by the user. The articles are formed into the bundle B by depositing them sequentially about the periphery of the bundle as it is being formed with the tail end of each article being wrapped under the head end of the next succeeding article so that they are trapped in a continuous chain on the bundle without physical joining of the articles.

The bundle of individual articles then is removed from the winding station 26 and positioned within the liquid processing apparatus 12 for removal of soil or dirt on the articles. As noted hereinabove, a strap or belt S is secured around the periphery of the bundle B to hold the loose articles in assembled relation as initially defined at the winding station 26.

As shown in FIGS. 4, 5 and 6 the bundle is processed in the apparatus 12 in a predetermined manner. The loading band 60 for deposit of new bundles into the apparatus 12 first is raised to the position shown at 60' in FIG. 4. The band 60 is raised by the winch 68 by winding the end of the band attached to the winch upon the drum. When the bundle B is in position on the raised band 60 the winch then releases a portion of the band to lower the bundle B to the processing position where the band will be in a position shown by the solid lines in FIG. 2 and will drop into a band receiving recess 46 in the rolls 40 and 42 of the apparatus 12. In this way the band 60 is moved out of contact with the bundle as it is deposited upon said rolls.

The retaining means 80 first is operated to withdraw the plate 94 to the position shown by the solid lines in FIG. 6 so that the plate 94 is moved out of the way of the bundle as it is placed in the apparatus 12 when the bundle is lowered into the apparatus 12 by the band 60 the retaining means 80 is operated to move the plate 94 against the outer wall of the bundle B and to push the newly placed bundle and all preceeding bundles along the rolls 40 and 42 for subsequent processing.

It should be observed that as the newly placed bundle is pushed into processing position the last bundle on the right, as viewed in FIGS. 5 and 6, will be pushed into the bundle removal position on rolls 40 and 42. The plate 106 of the retaining means 82 will be moved to the right to the position shown by the solid lines in FIG. 6 to permit the last bundle to be moved to its removal position. The band 62 then is elevated in the same manner as noted hereinabove with respect to band 60 and the elevated bundle is removed from the apparatus 12. The band 62 is then lowered so that it fits within the recesses 48 and 56 of rolls 40 and 42, respectively, and the retaining means 82 is operated to move the plate 106 against the end wall of the last bundle in the washing apparatus.

The above sequence may be changed by first removing one bundle from the apparatus 12 and then inserting a new bundle B into the apparatus for processing. This, of course, is a reversal of the sequence specifically described hereinabove.

The bundles B may be subjected to liquid processing in the receptacle 38. For example, a detergent may be placed in the receptacle 38 to assist in the removal of soil from the articles A in the bundles B. The roll 40 is driven by the motor 78 through a suitable drive mechanism, as described above. Rotation of the roll 40 will rotate the bundles B resting on the rolls 40 and 42. During this action the plates 94 and 106 press against the end bundles to hold the grouped bundles in vertical orientation in the receptacle 38.

The articles A are relatively tightly wrapped into the bundles B. However, the fabric of the articles itself is porous and there will be substantial open space within the bundles regardless of the nature of wrapping the articles. During rotation of the bundles B liquid will move into the spaces in the bundle B and into the porous fabric.

Roll 114 is moved down onto the bundles B to press against the bundles. The pressure results in a squeezing action on the bundles. The rolls 40 and 42 may be fluted or ribbed to provide sufficient traction for rotation of the bundles notwithstanding the force of the pressure roll 114 which resists rotation.

When the bundles are rotating through the liquid in receptacle 38 the liquid will move into the spaces in the bundle to soak the articles. Continued rotation of the bundles will bring the liquid soaked portion beneath the pressure roll 114. The roll 114 presses into the bundles B due to its weight and causes the bundles to deflect. This action results in expulsion of water through and from the spaces in the bundles. Continued movement of the cleaning liquid with respect to the articles is necessary for efficient cleaning of the fabric.

As the bundles B continue to rotate the squeezed portions will again move into the liquid bath. Once the pressure is relieved liquid will flow into the bundles to flow over and around the fabric. The squeezing action is repeated as the bundles pass over the rolls 40 and 42.

It can readily be seen that the cyclic application and release of pressure will give rise to a pumping action to continually move liquid into and out of the bundles as they are rotated in the receptacle 38. The pumping action will help to dislocate soil as the detergents loosen it and to move it from the bundles.

The water may be circulated through a pump and heat exchanger (not shown) to keep the water temperature at a predetermined level. The condition of the liquid may change with the nature of the fabric involved in the process and, of course, the treatment desired.

It should be noted that the pumping action noted above may be realized in other ways. For example, the bundles may be held stationary in a receptacle and pressure sequentially applied to the bundles at spaced points about the bundles. This action will provide for the desired surging of liquid through the bundles.

When the desired conditioning has been completed the bundle B longest in the receptacle 38 will be removed. This may be accomplished by moving the retainers 80 and 82 to the right (FIG. 5) to bring the end bundle over the strap 62. The strap is elevated and the bundle removed for further processing.

In the processing sequence with the apparatus shown (for purposes of illustration of the invention) the bundle B will be placed on the belt 140 for separation of the individual articles A forming the bundle. The belt is rotated and the first article A on the outside of the bundle B is placed on the takeoff table 148 (after removal of the strap from the outer periphery of the bundle). The first article is caught by the air moving through the perforated outer shell 174 of the suction roll 150. The article A moves against the outer shell 174 to be "picked up" by it. The movement of air through the shell 174 occurs only in that portion of the shell moving between the free ends of the mask 176 of the roll 150. Accordingly, lead end of the article A will drop off of the roll 150 after it passes the right terminal of the mask, as seen in FIG. 7. The forward momentum of the article A carries it onto the conveyor belt 160 where it will be carried along by movement of the conveyor belt.

Each successive article of the bundle B is placed in overlapped relation on the preceeding article so that a continuous chain of articles is defined in overlapped relation. The articles are not physically joined at any stage during the processing.

The successive lead ends of articles on the bundle B will be carried off of the bundle by the underlying tail end of the proceeding article A. The lead end of each successive article A is caught first by the suction roll 150 and then carried along to the conveyor belt 160, as described hereinabove in conjunction with the description of the first article from the bundle B. In this manner the articles A are continuously fed from the bundle B until the entire bundle has been separated into individual articles A.

The belt 140 will continue to move upwardly (FIG. 7) as the bundle B becomes smaller by removal of successive articles. This action keeps the articles in desired relation to the suction roll 150 so that each successive lead end of the articles will be deposited on the outer shell 174 by movement of air through said shell.

It should be noted that the articles A remain in overlapped relation during the remainder of the processing sequence described herein to provide for successive transfer of articles from station to station for processing. Thus, a continuous chain of material is defined without the need for physical joining of the articles for processing.

The articles A are fed from the conveyor belt 160 to the rinse mechanism. As seen in FIG. 7 the roll 196 is mounted such that the outer shell 200 is in close spaced relation to the end of the conveyor belt 160. As the lead end of the articles A drop off of the conveyor belt 160 it will be attracted to the outer shell 200 by reason of the air flow through the shell 200 from the outside to the inside of the shell. As noted hereinabove with respect to each of the suction rolls the air moves through the perforated shell to the interior thereof and into the hollow shaft to a vacuum source. A continuous movement of air is provided so that the articles will be attracted to and held against the outer surface of the shells in the portion thereof not covered by the masks.

In the stage noted above, the articles move onto the shell 200 after dropping off the conveyor belt 160 and are held by the shell throughout the entire movement along the unmasked portion of movement of the shell. As shown in FIG. 7 the articles are carried along to a vertical position on the shell 200. As they reach the lower vertical position of movement they move over the beginning portion of the masked area and drop off of the roll 196 onto the roll 204. The unmasked portion of roll 204 is closely spaced in relation to the roll 200 so that the articles A will be caught by air moving along and through the shell 206 of the roll 204.

Spray means 192 may be added to the rinse apparatus, as schematically illustrated in FIG. 7 at 192. Such spray means will force a rinse spray onto the articles A as they pass beneath the spray. The liquid from the spray means will be carried through the article by the air movement and will assist in removal of liquid from the preceeding processing stage. The evacuating apparatus used in conjunction with the rolls should be of the type capable of handling liquids during the evacuating operation.

The articles are held against the outer surface of the roll 204 and pass through a rinse bath (schematically illustrated in FIG. 7) where they will be further rinsed to remove processing liquid from entrapment in the articles A. As the articles A are moved through the rinse bath the rinse liquid will be drawn through the articles and into the interior of the roll by reason of the fact that a lower pressure is maintained within the interior of the roll than the pressure acting upon the surface of the liquid in the rinse mechanism 14.

It should be noted that the articles A are moved slowly through the rinse bath of the receptacle 182 so that the articles will be held tightly against the outer surface of the perforated shell of the rolls as they are carried through the rinse bath. If this condition is not maintained, the lead end of the articles may be pulled away from the surface of the roll thereby giving rise to a condition where the article may be lifted from the roll and dropped to the bottom of the receptacle 182. However, if the rolls are moved slowly the liquid adjacent to the articles as they move through the rinse bath will pass through the articles and into the rolls rather than passing forcibly along the articles.

The articles are carried along on the surface of the roll 204 to the position where the mask 210 blocks passage of air through the perforated outer shell 206 of the roll 204. At this area the third roll 212 is in closely spaced relation to the roll 204. Accordingly, the unmasked area of the roll 212 will attract the articles A in preference to the masked area of the roll 204. In this way the articles are transferred from the outer surface of roll 204 to the outer surface of roll 212 for further processing.

As the articles are moved along on the surface of roll 212 during rotation thereof they pass beneath a second spray roll 194. This spray roll, as noted above in conjunction with the discussion of roll 192, is adapted to direct a stream of rinse liquid against the articles. The rinse liquid is drawn through the articles and to the interior of the roll 212. In this way soil or other foreign materials entrapped in the fabric defining the articles A will be loosened and removed from the articles.

The articles are carried along on the outer surface of the roll 212 to an area adjacent to the mask 216 associated with said roll. At this point the roll 218 is in closely spaced relation to the roll 212 and the articles are transferred from the roll 212 to the outer surface of the roll 218. The articles are carried along on the outer surface of the roll 218 through the rinse bath in a receptacle 182 for a second stage immersion in said bath. The function of this bath is identical to that described above in connection with discussion of the operation of the roll 204 and the articles passing thereover.

The articles A are carried along a roll 218 to the beginning of the masked area 222 where they are transferred to the unmasked portion of the roll 226 where a substantial amount of the liquid trapped within the articles is removed by the passage of air through the fabric. The air, of course, will force the liquid out of the fabric and into the center of the roll 226. The articles then are transferred from suction roll 226 to a subsequent suction roll 234, over roll 236 and onto the outer surface of roll 240. These rolls are adapted for the transfer of articles from the rinse immersed 14 to the drier or ironer 16. It should be noted that any suitable transfer device may be provided for moving the articles from one mechanism to the other. The roll apparatus is illustrated here for purposes of illustration of the invention and process contemplated by the inventor and is not intended as restrictive as to the means for transfer of articles from one stage of processing to the other. For example, a conveyor may be used such as that shown for transfer of articles from the bundle B into the rinse mechanism 14. This conveyor belt is identified at 160 in FIG. 7.

The articles are transferred from the last transfer roll 240 onto the first roll 266 of the drier-ironer. The articles are carried along the smooth-perforated outer surface 268 of the first roll 266. Heated air is injected to the chamber 16. The heated air, of course, is drawn through the articles and through the perforated outer shell 268 of the first roll 266 where it then passes along the hollow shaft 270 to a vacuum source.

The temperature of the air within the cabinet 260 should be sufficiently high to provide for rapid evaporation of air to dry the fabric defining the articles A. Also, the movement of air should be at a sufficiently high velocity to forcibly draw the articles against the smooth outer surface of the shell 268 so that the articles will assume the flat transverse definition of the shell and have an ironed appearance when they emerge from the drier-ironer 16.

As schematically illustrated in FIG. 7 (in fragmentary form) the articles are transferred to subsequent rolls 266 to be carried along the perforated outer shells associated with said rolls for complete drying and smoothing of the fabric defining the articles A. In this manner a sufficient time period may be provided for the desired action within the cabinet 260. It should be noted that the drying rate is a function of the temperature of air passing through the fabric and the time in the cabinet 260 may be varied, in part, by the air temperature.

I have described above only one method of processing individual articles in a substantially continuous fashion without physically joining the articles for processing. Other means may be devised for physically accomplishing the processing specifically disclosed herein without departing from the substance of the invention I have disclosed. For example, during the liquid processing stage (washing as described here) the bundles B may be held stationary and movement of liquid and pumping action of the liquid through the bundles may be achieved by the use of squeezer paddles or the like which would sequentially exert the pressure on the outer surface of the bundles B while they are emersed in liquid. The concept is substantially the same as otherwise described herein. It is necessary to have a continuous surge of liquid through the fabric defining the articles as they are assembled in the bundle while keeping the bundles immersed in the liquid in the desired bundle configuration for further processing. It also should be observed that water may be removed by physically exerting a squeezing action on the fabric defining the articles accompanied by drying with heated air. It should be noted, however, that pumping may not be required in all instances of operation. It may be sufficient, for example, simply to soak the articles if sufficient time is available and proper bundle wrapping is realized.

While I have shown and described a specific embodiment of the present invention it will, of course, be understood that other modifications may be used without departing from the true spirit and scope of this invention. I therefor intend by the appended claims to cover all such modifications as fall within their true spirit and scope.

I claim:

1. An improved method for continuously processing individual articles without physically joining said articles during processing, comprising the steps of:
    placing the articles in a bundle such that they are sequentially overlapped in end-over-end relation to define a roll of predetermined diameter;
    securing the bundle to prevent release of articles therefrom;
    immersing the bundle in liquid to treat the articles as desired;
    removing the bundle from the liquid and releasing the securing means therefrom; and
    sequentially individually removing the articles from the bundle and passing them continuously in end-over-end relation through subsequent processing stages with the articles being retained on processing apparatus in sequential end-over-end relation by differential pressure thereacross until processing is completed.

2. The method of claim 1 wherein liquid is continually forced into and out of the bundle while it is immersed in liquid for treatment to cause the liquid to uniformly condition the articles secured within the bundle.

3. The method of claim 2 wherein the liquid is forced into and out of the bundle by repeated sequential application of and removal of a force against the bundle.

4. The improved method of claim 1 wherein the individual articles are passed in end-over-end relation through the processing stages by movement of the articles along surfaces having a differential pressure thereacross.

5. The method of claim 4 wherein the surfaces are defined in the form of closely spaced rolls having perforated outer walls along which the articles are passed.

6. The method of claim 5 wherein the individual articles are passed from roll to roll in movement of the articles through the processing stages by appropriate masking of successive roll surfaces to provide means for transfer of the articles from roll to roll by the action of differential pressure defined between the outer and inner roll surface.

7. Apparatus for liquid processing of a bundle of individual articles each being of predetermined length, comprising:

a liquid holding receptacle;

support means within said receptacle to moveably support the bundle of articles for liquid processing therein;

retaining means within the receptacle to hold the bundle in proper orientation for processing; and pressure means to cyclically apply and release predetermined squeezing force to the bundle of articles during processing of the bundle whereby liquid cyclically is introduced to the articles during the pressure release portion and removed during the pressure application portion to define enhanced liquid processing of the articles within the receptacle by continuously causing the liquid to move into contact with all portions of the bundle and to flow through the bundle as a result of the pumping action caused by the repetitive application and release of pressure during processing.

8. The apparatus of claim 7 wherein the support means within their receptacle includes a pair of rolls rotatably disposed adjacent the bottom of the receptacle.

9. The apparatus of claim 8 wherein at least one of the rolls is driven to provide for rotation of the bundles within the liquid holding receptacle during conditioning of the bundles.

10. The apparatus of claim 7 having means to charge and discharge bundles from the liquid holding receptacle.

11. The apparatus of claim 10 wherein the charging and discharging means includes an extensible member to hold and lift the bundles into and out of the receptacle.

12. The apparatus of claim 7 wherein the retaining means is defined by a holding plate extending along either side of the bundles within the receptacle to hold them in a substantially vertical position for conditioning within the receptacle.

13. The apparatus of claim 7 wherein the pressure means is defined by a weighted member adapted to ride on the surface of the rolls to apply the squeezing force.

14. The apparatus of claim 13 wherein the weighted member is provided with means to lift the weight from the surface of the rolls and to subsequently release the weight for repeated application and release of the squeezing force defined against the bundle of articles within the liquid holding receptacle.